United States Patent
Butler

(10) Patent No.: US 8,210,599 B2
(45) Date of Patent: Jul. 3, 2012

(54) AERODYNAMIC AND PROTECTIVE VEHICLE PANEL ASSEMBLY AND METHOD OF CONSTRUCTING SAME

(75) Inventor: Joshua Butler, Austin, TX (US)

(73) Assignee: Joshua Butler, Austin, TX (US)

( * ) Notice: Subject to any disclaimer, the term of this patent is extended or adjusted under 35 U.S.C. 154(b) by 79 days.

(21) Appl. No.: 12/785,715

(22) Filed: May 24, 2010

(65) Prior Publication Data

US 2011/0285167 A1  Nov. 24, 2011

(51) Int. Cl.
*B62D 35/00* (2006.01)

(52) U.S. Cl. .................. 296/180.1; 296/180.4

(58) Field of Classification Search ............... 296/180.1, 296/180.4, 180.5, 181.5
See application file for complete search history.

(56) References Cited

U.S. PATENT DOCUMENTS

| | | | | |
|---|---|---|---|---|
| 614,008 | A | * | 11/1898 | King .............................. 52/143 |
| 2,068,715 | A | * | 1/1937 | Stevens ...................... 296/181.1 |
| 2,126,711 | A | * | 8/1938 | Atwood .......................... 442/60 |
| 2,877,510 | A | * | 3/1959 | Bruemmer ...................... 52/509 |
| 5,069,009 | A | * | 12/1991 | Suzuki ........................... 52/81.3 |
| 5,114,099 | A |   | 5/1992 | Gao |
| 5,280,990 | A | * | 1/1994 | Rinard ....................... 296/180.1 |
| 6,056,349 | A | * | 5/2000 | Seksaria et al. ............ 296/146.6 |
| 7,041,363 | B2 |   | 5/2006 | Krohmer et al. |
| 7,578,541 | B2 | * | 8/2009 | Layfield et al. ............ 296/180.2 |
| 7,805,213 | B2 | * | 9/2010 | Schwenn ...................... 700/118 |

* cited by examiner

*Primary Examiner* — Jason S Morrow
(74) *Attorney, Agent, or Firm* — Streets & Steele

(57) ABSTRACT

An aerodynamic panel assembly with surface macrostructure is provided for a land vehicle. The panel assembly includes a first plurality of slats each having a longitudinal length greater than its width, and a second plurality of slats each having a longitudinal length greater than its width. The first and second plurality of slats are interwoven, thereby providing significant structural strength while increasing the versatility of the panel assembly to be used on various types of vehicles. Various types of attachment mechanisms are provided for attaching a panel assembly to the vehicle.

19 Claims, 7 Drawing Sheets

AERODYNAMIC AND PROTECTIVE VEHICLE PANEL ASSEMBLY AND METHOD OF CONSTRUCTING SAME

FIELD OF THE INVENTION

The present invention relates to aerodynamic and protective devices for land vehicles. More particularly, the invention is related to a structural panel assembly with a surface macrostructure for reducing aerodynamic drag and improved protection of damage-prone regions of the vehicle, such as the underbody.

BACKGROUND OF THE INVENTION

Various types of aerodynamic panels have been devised for reducing vehicle drag, including panels which are generally positioned on the underside of the vehicle. Newly manufactured high performance vehicles, for example, commonly use cowlings or panels manufactured from a unitary sheet to reduce the air drag under a vehicle. These same panels cannot be easily modified, however, to fit older vehicles. Moreover, these panels may encounter rocks or other objects when the vehicle is driving at a high rate of speed, and the panels frequently crack or tear, so that new panels are required.

Various types of aerodynamic surfaces have also been devised for reducing drag in turbulent flow. U.S. Pat. No. 7,041,363 discloses a microstructured surface in a solid body to reduce frictional or flow resistance when a gas or liquid flows over the object. The surface geometry of an object, i.e. the dimples on a golf ball, can influence the fluid dynamics for the object in relative motion to a fluid. Rough surfaces known in the art can improve turbulent airflow by affecting the boundary layer flow, or flow structures like large eddies and vortices. The aerodynamic benefits of integral rough surfaces are compromised however by the added manufacturing costs of machining patterns such as wavelets and diamonds as disclosed in U.S. Pat. No. 5,114,099.

While the benefits of aerodynamic panels on the undersides of vehicles has been thoroughly demonstrated to reduce drag and improve gas mileage, a low percentage of vehicles presently use such panels in an effective manner. As indicated previously, the panels currently installed on high performance vehicles cannot be easily modified or adapted to other vehicles. The need thus exists for a low-cost aerodynamic panel which has broad utility and may be added to existing vehicles.

The disadvantages of the prior art are overcome by the present invention, an improved aerodynamic panel assembly and method are hereinafter disclosed.

SUMMARY OF THE INVENTION

An aerodynamic and protective panel assembly is provided for a land vehicle comprising of a plurality of overlapping slats forming a non-smooth woven surface macrostructure exposed to a fluid, such as air, having relative motion to the vehicle or device. The aerodynamic protection device includes overlapping slats each extending across the width of one or more slats, whereby slats are preferably arranged in a pattern configuration with each slat having a substantially rectangular profile. Additional types and variations of slats discussed herein provide further functionality and benefits.

Also provided is an improved method for constructing similar panel assemblies or components thereof in order to achieve, for example, additional aerodynamic or protective benefits, such as controlling the fluid flow or improving mechanical properties. The construction method described herein is an improved construction method for aerodynamic and protective devices for land vehicles whereby a plurality of slats are overlapped and assembled to form a more aerodynamic or durable device.

Further features and advantages of the present invention will become apparent from the following detailed description, wherein reference is made to the figures in the accompanying drawings.

DETAILED DESCRIPTION OF PREFERRED EMBODIMENTS

Figure 1:
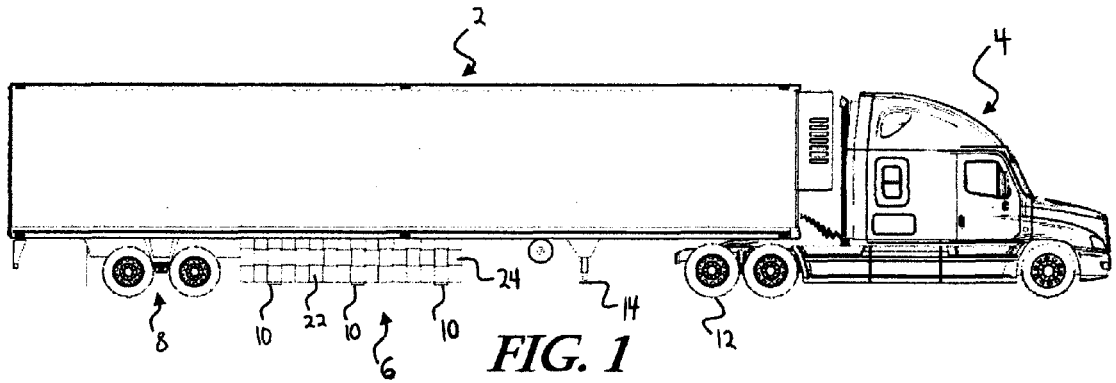
FIG. 1 is a right elevation view of a tractor-trailer road vehicle showing the front of the panel assembly mounted to the lower side of the vehicle.

Referring now to FIG. 1, a woven panel assembly 6 for the underbody of a tractor-trailer road vehicle is shown. The panel 6 as shown in FIG. 1 is mounted to the lower sides of the trailer 2 between the trailer rear axles 8 and landing gear 14. The panel 6 may alternatively extend forward beyond the landing gear 14 to the tractor wheels 12.

The panel assembly 6 comprises a plurality of vertical slats 22 and interwoven horizontal slats 24. Three mounting slats 10 are interwoven into panel assembly 6 similar to vertical slats 22. Mounting slats 10 may be reinforced, along with the top slat and the bottom slat, to provide more rigidity to the panel. Reinforcing slats may be formed, for example, from metal, while the remaining slats may be formed from plastic.

Figure 2:
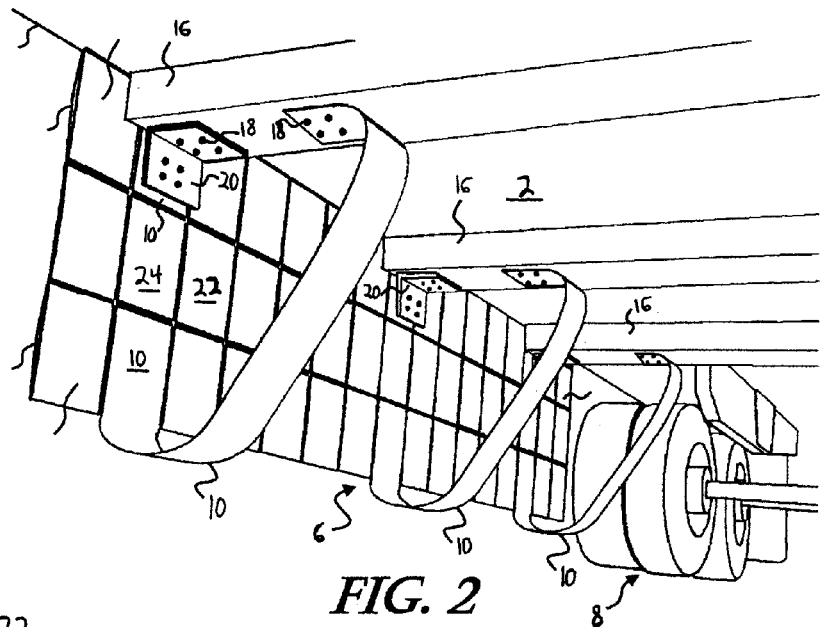
FIG. 2 is a pictorial view of the mounted panel assembly shown in FIG. 1.

FIG. 2 is a pictorial view of the panel 6 from beneath the trailer 2 as shown in FIG. 1 and more clearly depicts the mounting slats 10 secured to the angled mounting brackets 20 and trailer frame beams 16. Referring now to the woven end of mounting slats 10, this end of the slat 10 is secured to angled mounting brackets 20 with fasteners 18. Mounting brackets 20 in turn are secured to frame beams 16 with fasteners 18, as shown. The non-woven ends of mounting slats 10 are secured to frame beams 16 with fasteners 18. For this embodiment, mounting slats 10 are preferably bent inward and secured to the frame beams 16 a distance from brackets 20 to provide a balance of rigidity and flexibility to the panel assembly 6. Although conventional fasteners 18 are shown in this embodiment to secure mounting slats 10 to frame beams 16, various mounting mechanisms or auxiliary brackets are known in the art and may be suitable alternatives for securing the mounting slats to frame beams.

Figure 3:
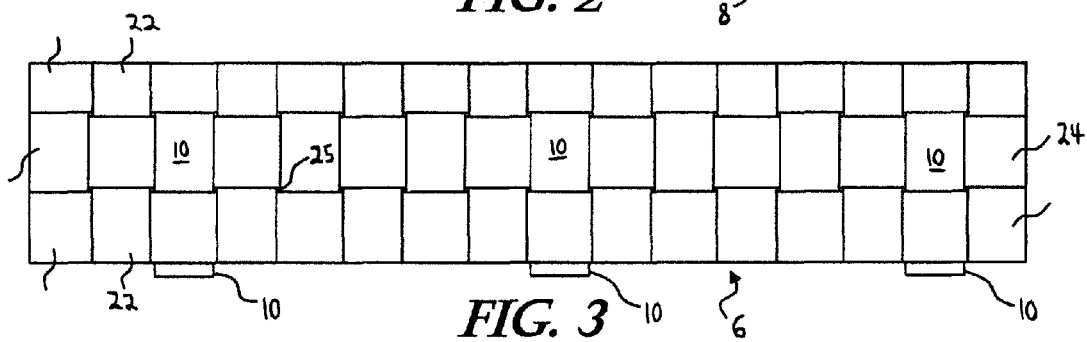
FIG. 3 is a front view of the panel assembly shown in FIG. 1.

FIG. 3 is a front view of the panel assembly shown in FIG. 1, and illustrates more clearly the panel assembly 6 with vertical slats 22 and interwoven horizontal slats 24. Openings 25 are inherent to the panel assembly 6 since vertical slats 22 do not directly contact other vertical slats and horizontal slats 24 do not directly contact other horizontal slats 24. If slats are instead woven tightly such that slats 22 and slats 24 are in direct side-to-side contact with each other, it is possible that no openings 25 will be formed, or that any spacing between slats will be negligible.

Figure 4:
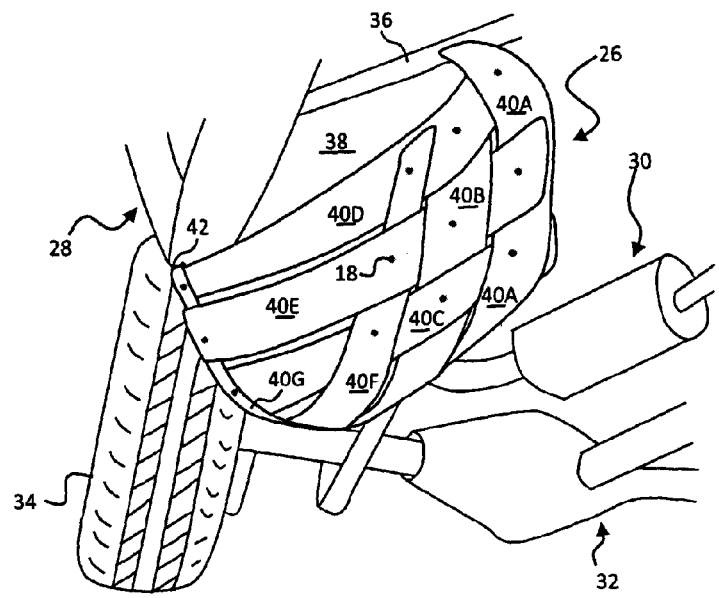
FIG. 4 is a pictorial view of the exterior side of the shaped panel assembly shown mounted to the underbody of a road vehicle.

FIG. 4 is a pictorial view of the exterior of another panel assembly 26 in a partially woven configuration shown mounted to a road vehicle underbody 38. The lower side of the road vehicle body 28 may contact the shaped panel 26 as shown in the figure, or the vehicle body 28 may serve as a mounting location for the panel 26 using sheet metal screws. The exhaust assembly 30, rear axle assembly 32, and rear tire 34 are shown to the right and behind the panel 26. The chassis opening 36 receives both the overlapping slats 40A and 40D. Slats 40A, 40D, and 40G may have substantial bending and curvature, and also may function as mounting slats.

Figure 5:
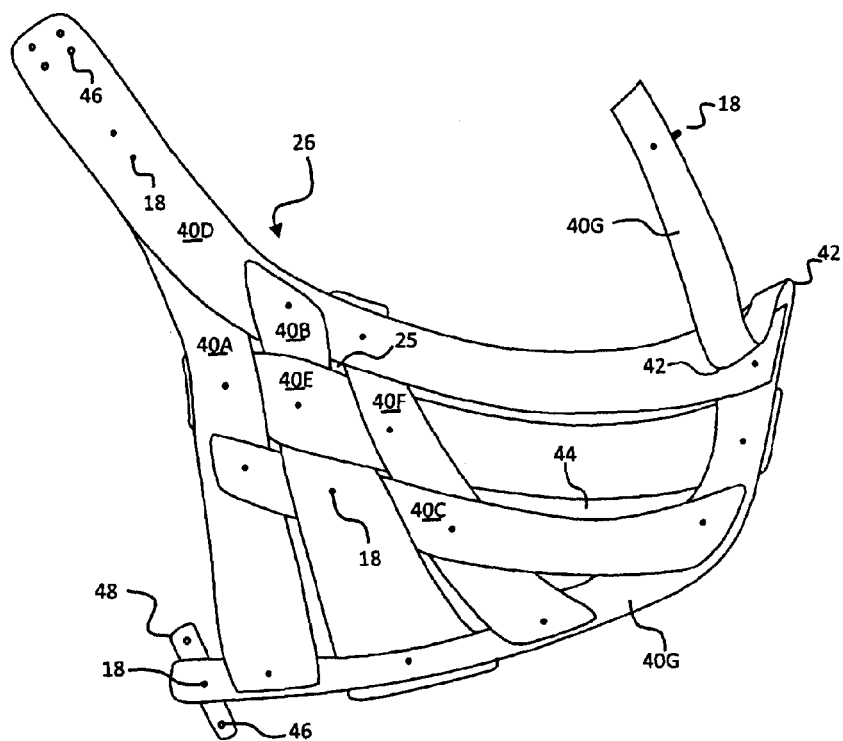
FIG. 5 is a pictorial view of the interior side of the shaped panel assembly shown in FIG. 4.

FIG. 5 is a pictorial view of the interior side of the shaped panel assembly 26 shown in FIG. 4 which more clearly illustrates the slats 40 and holes for mounting the assembly 26 to the vehicle underbody 38. Each slat 40 is fastened to other overlapping slats 40 with fasteners 18. Each slat 40B, 40C, 40E, 40F is secured to mounting slat 40G and to either mounting slat 40A or 40D with fasteners 18. Slats 40B, 40C, 40E, and 40F may be tapered, angled, bent, twisted, curved or more generally machined or formed as required to obtain the desired shape, aerodynamic characteristics, and structural properties of the device. The shaped panel assembly 26 with slats 40 has openings 25 between tightly woven slats and gap regions 44 between non-woven, loosely woven, or spaced slats. Slats 40A and 40D may also function as a single reinforcing slat because they are fastened together with fasteners 18 and have an effective thickness greater than other slats. Slats 40A and 40D have holes 46 for securing with auxiliary devices after receipt by chassis opening 36, as shown in FIG. 4. A flat mounting bracket 48 is secured to mounting slat 40g with fastener 18 as shown in the lower left of FIG. 5. Mounting slat 40G may also have formed bends 42 and extended length to mount to the vehicle underbody 38 with fastener 18 as shown in the upper right of FIG. 5.

In a variation of the FIG. 5 embodiment, slats 40B, 40C, 40E, and 40F may be removed, and the width of the remaining slats increased and/or the spacing between the slats reduced so that slats 40A, 40B, and 40G constitute all the slats of the panel assembly. Preferably one or more of these remaining slats, such as slat 40G, extends beyond the panel assembly and may be used for mounting the panel assembly by inserting an end of the extended slat through an opening in the vehicle, then using a clip or other member to secure the extended slat and thus the panel assembly in place. Extended straps may thus be mounted to the vehicle as disclosed in FIG. 28 discussed below.

In some applications, only one or two of the slats may be interwoven with other slats, and in other embodiments none of the slats are interwoven. The panel assembly may thus comprise of two or more generally parallel and adjoining first slats, and two or more generally parallel and adjoining second slats each perpendicular to the first slats.

As noted subsequently, not all slats need be interwoven, e.g., only one or two of the slats may be interwoven with other slats. Also, the exterior surface of each slat may be a micromachined or microformed surface, as disclosed in the prior art, to further reduce aerodynamic drag when air flows over the panel assembly. The entire panel may be aerodynamically configured to reduce aerodynamic drag.

Figure 6:
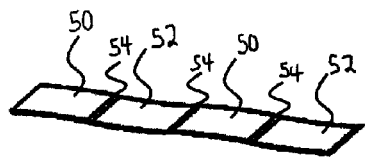
FIG. 6 is a pictorial view of a standard slat.

FIG. 6 is a pictorial view of a standard slat. The shallow hills 50 and valleys 52 of the slat, as well as the woven bend 54 of the slat, are inherent to interwoven configuration. The slat as shown in FIG. 6 is not formed bent before it is woven, rather its bend is inherent when interwoven with other slats. The hills and valleys may be formed from bends, each perpendicular to the longitudinal length of the slat, or the bend may be canted, as shown in FIGS. 4 and 5.

Figure 7:
FIG. 7 is a side view of the standard slat shown in FIG. 6.

FIG. 7 is a side view of the standard slat shown in FIG. 6 which illustrates the thickness dimensions of the FIG. 6 slat. T1 corresponds to the material thickness dimension of the FIG. 6 slat. T2 corresponds to the woven thickness of the FIG. 6 slat. The woven slat thickness is measured by the overall height of a single woven slat. The thickness of a slat T1 is typically in the range of 1/64 inch to 1/2 inch. T2 is typically 1.1 to 5 times the dimension of T1 for standard slats.

Figure 8:
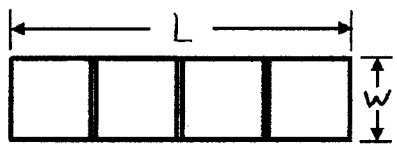
FIG. 8 is a top view of the standard slat shown in FIG. 6.

FIG. 8 is a top view of the standard slat shown in FIG. 6 with length L and width W dimensions defined. L corresponds to the overall length dimension of the slat as measured along the centroidal axis of the slat. W corresponds to the width dimension of the slat as measured across the greatest dimension of the hills 50 and valleys 52 of slats. Each slat preferably has a width which is at least twice the thickness of the slat, and in most cases the slats will have a width of at least 1/4 inch.

Figure 9:
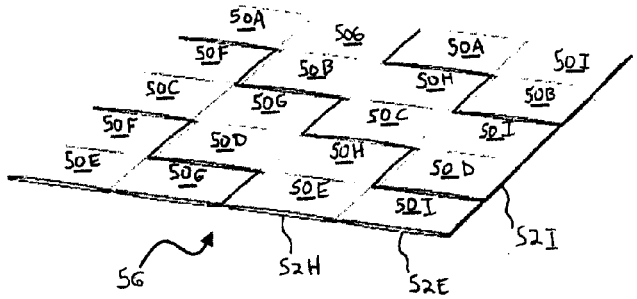
FIG. 9 is a pictorial view of a standard panel assembly with a plurality of interwoven FIG. 6 slats.

FIG. 9 is a pictorial view of a standard panel assembly 56 which more clearly depicts the shallow hills 50 and valleys 52 of interwoven FIG. 6 slats. The hills 50 and selected valleys 52 are shown for the interwoven slats A-I.

Figure 10:
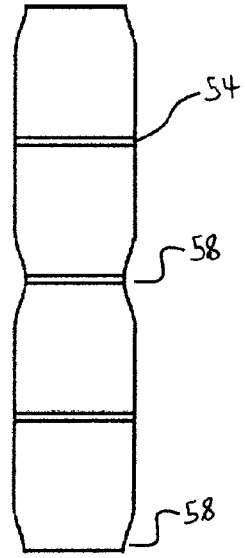
FIG. 10 is a top view of a cutout featured slat.

FIG. 10 is a top view of a cutout slat which shows edge cutouts 58 in proximity to alternate bend regions 54.

Figure 11:
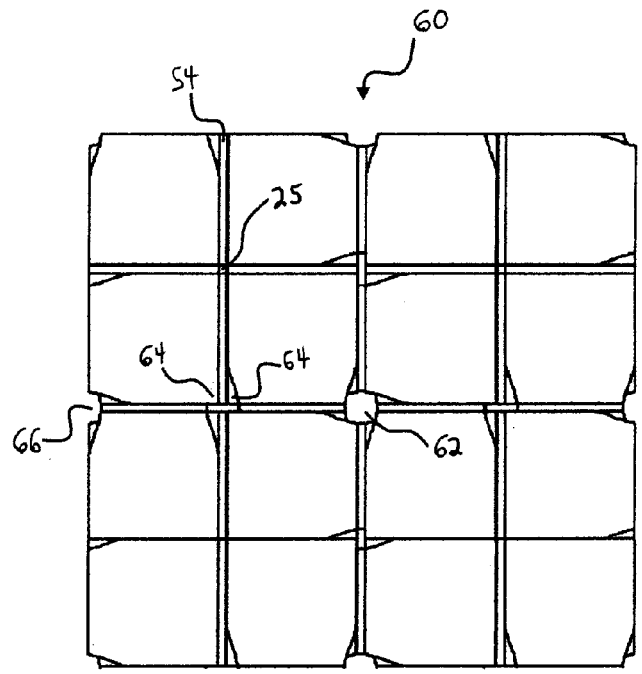
FIG. 11 is a top view a cutout panel assembly with a plurality of interwoven FIG. 10 slats.

FIG. 11 is a top view of a cutout featured panel assembly 60 with four vertical FIG. 10 slats interwoven with four horizontal FIG. 10 slats. FIG. 11 more clearly illustrates how slats may create new features and benefits in a woven assembly. In this embodiment, new assembly features created are cutout openings 62, non-overlap regions 64, and edge openings 66. The advantages of the cutout openings 62 may include reduced stress concentrations of slats near the openings. Further benefits of openings 62 may include improved flexibility to the assembly and ventilation or through-flow of fluid between top and bottom regions of panel assembly 60.

Figure 12:
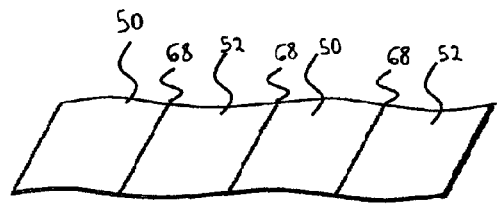
FIG. 12 is a pictorial view of a standard formed slat.

FIG. 12 is a pictorial view showing a standard formed slat with preformed bends 68. In this embodiment, the similar hills 50 and valleys 52 of the FIG. 6 slat are obtained before the slat is woven into an assembly through conventional pre-assembly bending or forming methods which may include line bending, vacuum forming, drape forming, or other thermoforming and forging construction methods. Alternatively, the slats may be at least partially interwoven then heated to form the respective hills and valleys.

Figure 13:
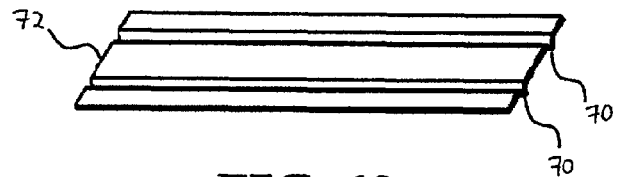
FIG. 13 is a pictorial view of a ribbed and channeled formed slat.

FIG. 13 is a pictorial view of a ribbed and channeled formed slat with formed ribs 70 and formed channel 72. Ribs 70 and channels 72 may be formed into slats using conventional forming means and generally in any number, shape, and direction required to achieve desired structural or aerodynamic benefits, such as improved slat rigidity and therefore panel assembly rigidity, and also for example aerodynamic drag reduction since channels or ribs may direct or deflect fluid flow for reduced drag.

Figure 14:
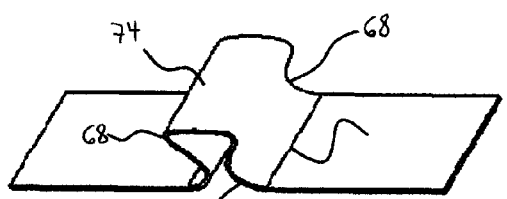
FIG. 14 is a pictorial view of a multi-bend formed slat.

FIG. 14 is a pictorial view of a multi-bend formed slat with formed bends 68 creating an outermost face 74. The bends 68 and outermost face 74 may effectively form an integrated hinge or pivot whereby unconstrained bending axis or axes parallel to the bends 68 may permit either end of the slat and therefore the assembly to fold about the bending axis. Additional benefits of the bends 68 and outermost face 74 may include protection or impact absorption similar to an underbody skid plate or vehicle bumper since the face 74 of the slat may extend closer to the ground or to the front of the vehicle than other parts of the assembly, and therefore is more likely to contact the ground or foreign objects before or instead of the other assembly parts. The multi-bend formed slat may also have aerodynamic advantages if the fluid flow is properly directed or deflected by the bent slat for drag reduction or improved cooling.

Figure 15:
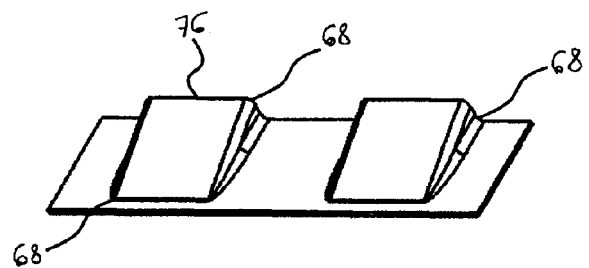
FIG. 15 is a pictorial view of a ducted formed slat.

FIG. 15 is a pictorial view of a ducted formed slat with formed bends 68 and molded ducts 76. Ducts 76 as shown create an aerodynamic fluid flow passage which may permit through-flow or ventilation between the top and bottom regions of a slat or panel assembly. Through-flow or ventilation aerodynamic advantages achieved through ducts may differ from advantages through cutout openings 62 in FIG. 11, since the general flow direction and momentum, which is assumed to be substantially parallel to the width dimension W in this case, is preserved rather than disturbed. The ducts 76 direct air flow through or past the panel assembly. Additional aerodynamic advantages of ducts 76 may include increased flow attachment or flow separation as desired.

Figure 16:
FIG. 16 is a pictorial view of a twist-bend formed slat.

FIG. 16 is a pictorial view of a twist-bend formed slat with twist edges 78 and twist opening 80. Twist edges 78 are similar to the longitudinal edges of a standard slat but their incremental angle at any location along the edge changes with respect to other edges. Twist openings 80 may be formed inherently with any twist-bend and may provide the aerodynamic advantages similar to vortex generators, deflectors, ducts, vents, or similar aerodynamic devices known in the art.

Figure 17:
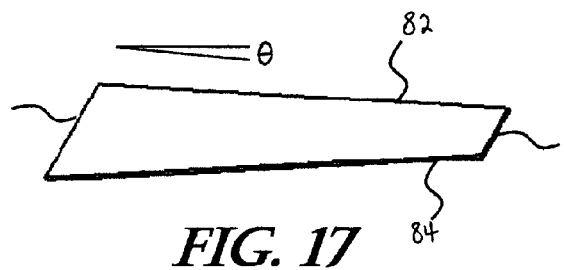
FIG. 17 is a pictorial view of a chamfered or angle-cut machined slat.

FIG. 17 is a pictorial view of a tapered machined slat showing tapered edges 82 on the slat at angle θ relative to the original lengthwise edge of the slat. The FIG. 17 slat may also be referred to as a chamfered or angle cut slat. The slat may be machined to have any number of tapered edges 82 at an angle θ relative to any edge of the slat. Tapered slats are used preferably for some slats in the shaped panel assembly 26 to obtain the desired shape. Chamfers and other angle cuts to slats may be preferable for example for inserting slats into chassis openings 36, or to obtain a flush or less abrupt edge as desired, similar to the slats.

Figure 18:
FIG. 18 is a pictorial view of an outer cutout machined slat.

FIG. 18 is a pictorial view of an outer cutout machined slat shown in FIG. 10 and discussed above.

Figure 19:
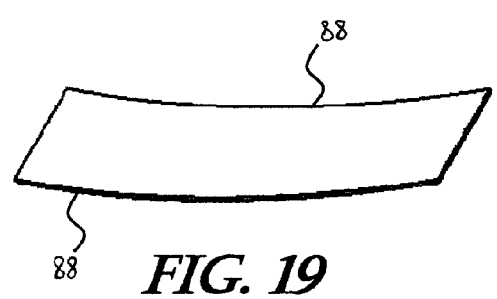
FIG. 19 is a pictorial view of a curved machined slat.

FIG. 19 is a pictorial view of a curved machined slat having curved edges 88. Curved machined slats may be preferable in shaped panel assembly 26 whereby the slats 40 may not require expensive forming operations if they can be machined to obtain the same effective curvature of the panel assembly 26. Further, the curved slats may direct flow in an aerodynamically advantageous manner such as slat 40D in front of the rear tire 34, as shown in FIG. 4.

Figure 20:
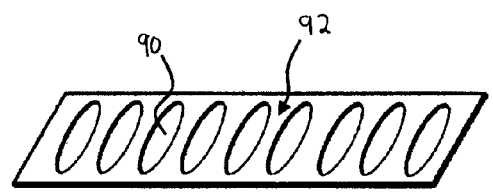
FIG. 20 is a pictorial view of an inner cutout machined slat.

FIG. 20 is a pictorial view of an inner cutout machined slat having inner cutouts 90 in cutout arrangement 92. Inner cutouts 90 are shown with an elliptical shape but may be rectangular, circular, triangular, or of any other shape or pattern that can be cut into the slat. The inner cutout machined slat of FIG. 20 may have any number of cutouts 90. The slat as shown has nine inner cutouts 90 spaced approximately equally from each other to define the linear pattern cutout arrangement 92. Cutouts may be arranged similar to arrangement 92, or non-linearly. The benefits of inner cutouts 90 are similar to the benefits described for edge cutouts 58 in FIGS. 10 and 11 whereby ventilation or through-flow of fluids between the top and bottom regions of the slat or panel assembly is obtained.

Figure 21:
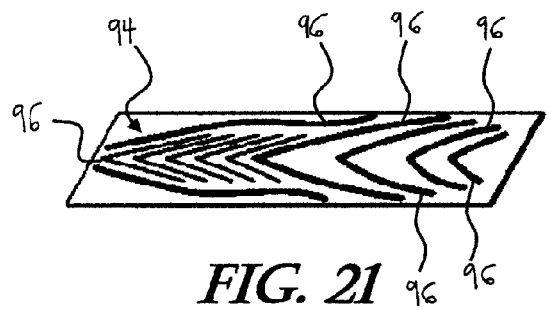
FIG. 21 is a pictorial view of a microsurface machined slat.

FIG. 21 is a pictorial view of a slat with microsurface arrangement 96. The arrangement 96 is composed of one or more machined microsurfaces 94 which divert a fluid in relative motion to the slat surface (in this case, a leftward motion of the slat through air). Surfaces 94 are preferably formed or machined into the surface but may also be of another material or object affixed to the surface. The FIG. 21 slat may be provided with surfaces 94 for aerodynamic benefit beyond directionality. A highly dimensional or turbulent flow may be affected by slat 21 with surfaces 94 arranged for drag reduction, improved flow control, improved flow attachment, improved flow separation, turbulence generation or reduction, or other aerodynamic benefits using microsurfaces and microsurface patterns known in the art.

Figure 22:
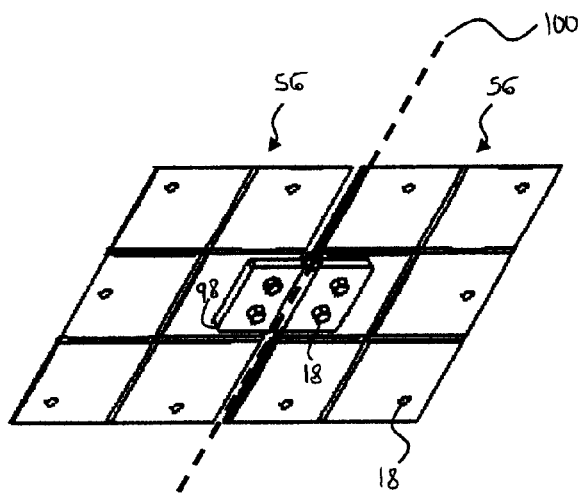
FIG. 22 is a pictorial view of auxiliary hinge feature pivotably connecting two standard panel assemblies.

FIG. 22 is a pictorial view of auxiliary hinge 98 pivotably connecting two standard panel assemblies 56 about hinge axis 100. The hinge 98 is secured to panel assemblies 56 with fasteners 18. One or both of the panel assemblies 56 may be pivoted about the axis 100 in order to quickly obtain access to regions of the underbody of a vehicle, or also for improved storage and maneuverability.

Figure 23:
FIG. 23 is a pictorial view of an auxiliary deflector handle feature fastened to a standard slat.

FIG. 23 is a pictorial view of an auxiliary deflector handle 102 fastened to a standard slat with fasteners 18. The deflector handle 102 is not a slat but rather an auxiliary feature which can be attached with fasteners 18 to any slat in order to provide an aerodynamic deflector or other aerodynamic feature where the feature cannot be integrated into the slat. Further, the deflector handle 102 may have additional or other advantages such as to provide a handle for improved ease of transporting, mounting, or removing a panel assembly.

Figure 24:
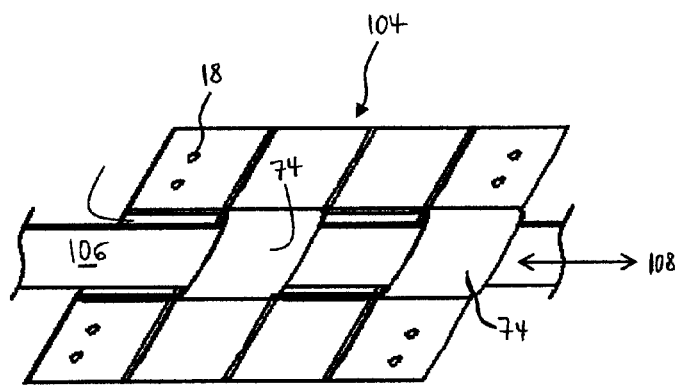
FIG. 24 is a pictorial view of a slideable panel assembly.

FIG. 24 is a pictorial view of a slideable panel assembly 104 with formed FIG. 14 slats having outermost faces 74, with the FIG. 14 slats receiving slideable slat 106 in slide direction 108. Slideable slats 106 may connect two panel assemblies in a sliding configuration for improved accessibility to regions of the vehicle underbody, since panel assemblies can translate in at least one slide direction 108. Further advantages of slideable slats may include reduced size for storage and transport as well as the slideable slat functioning as a reinforcing slat to strengthen the assembly 104.

Figure 25:
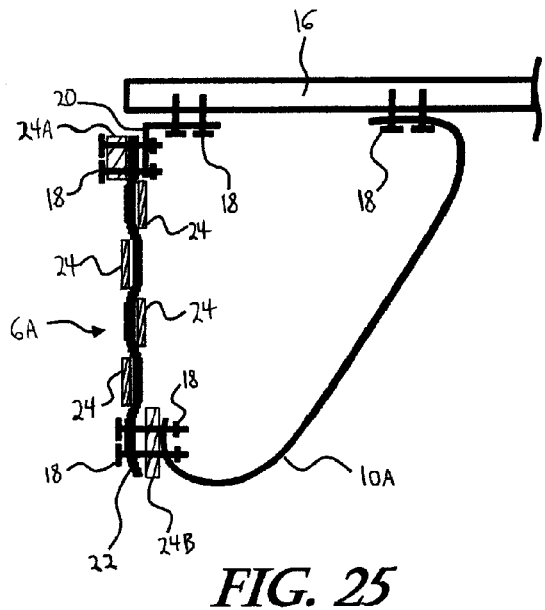
FIG. 25 is a section view of FIG. 1 panel assembly in mounting configuration 1.

FIG. 25 is a section view of the FIG. 1 panel assembly 6A in one mounting configuration 1. In this mounting configuration, mounting slat 10A is not interwoven with horizontal slats 24 but instead is secured on one end to trailer frame beam 16 with fasteners 18 and secured on the opposite end to horizontal slat 24B with fasteners 18. Horizontal slat 24B as shown in FIG. 25 is thicker and wider than other 24 slats and therefore is also a reinforcing slat. Vertical slat 22 fastened to slat 24B with fasteners 18, and from there above is interwoven with horizontal slats 24. Horizontal slat 24A, the top slat, is thicker than other 24 slats and therefore is also a reinforcing slat. Slats 24A and 22 are fastened to mounting bracket 20 with fasteners 18. Mounting bracket 20 is secured to frame beam 16 with fasteners 18 to substantially support panel assembly 6A.

Figure 26:
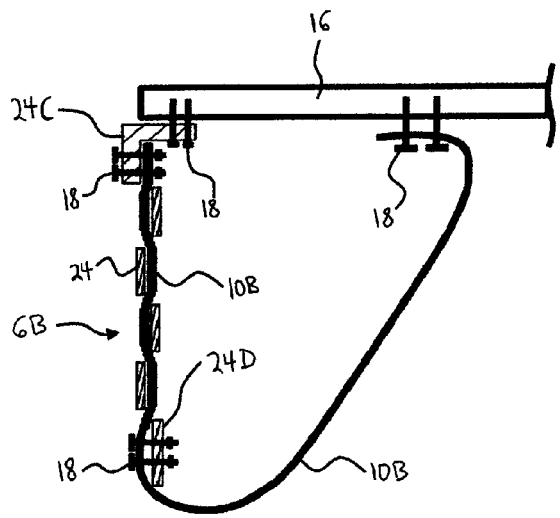
FIG. 26 is a section view of FIG. 1 panel assembly in mounting configuration 2.

FIG. 26 is a section view of the FIG. 1 panel assembly 6B in a second mounting configuration. This mounting configuration is similar to the FIG. 25 mounting configuration except that mounting slat 10B also performs the function of a vertical slat 22. There are major advantages of integrating mounting slats and woven slats as shown in FIG. 26 in that the total parts, materials, and therefore cost of the device 6B is reduced. Further differences between the FIG. 26 configuration and the FIG. 25 configuration include slat 24D having a width greater than horizontal slats 24 and therefore slat 24D also serving as a reinforcing slat. Still further differences between the FIG. 26 configuration and the FIG. 25 configuration include horizontal slat 24C also functioning as a mounting slat with fasteners 18 securing the 24C slat to frame beam 16. Slat 24C is thicker, bent similar to mounting bracket 20, and is therefore a featured, reinforcing, and mounting slat.

Figure 27:
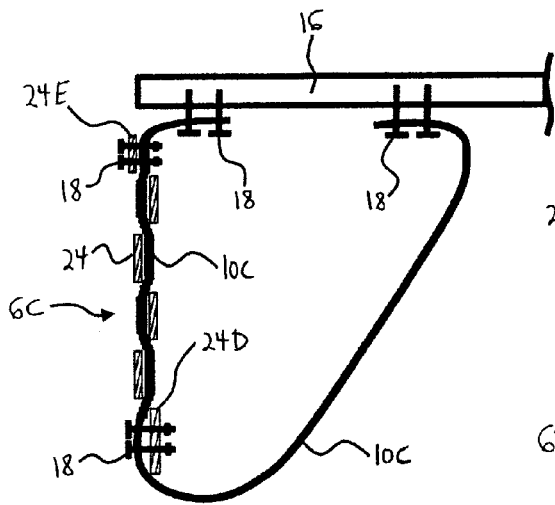
FIG. 27 is a section view of FIG. 1 panel assembly in mounting configuration 3.

FIG. 27 is a section view of the FIG. 1 panel assembly 6C in a third mounting configuration. The mounting configuration of FIG. 27 is similar to FIG. 26 mounting configuration except that mounting slat 10C is secured to frame beam 16 at both ends of the slat passing through a hole or aperture then secured a with fastener 18. A further difference between the FIG. 27 configuration and the FIG. 26 configuration is that the device 6C includes horizontal slat 24E, the top slat, which is thinner in width but formed of a stronger material than horizontal slats 24 and is therefore also a reinforcing slat. With mounting slat 10C now functioning as a mounting slat at both ends of the slat, cost reduction and ease of installation advantages may also be realized with fully integrated mounting slats.

Figure 28:
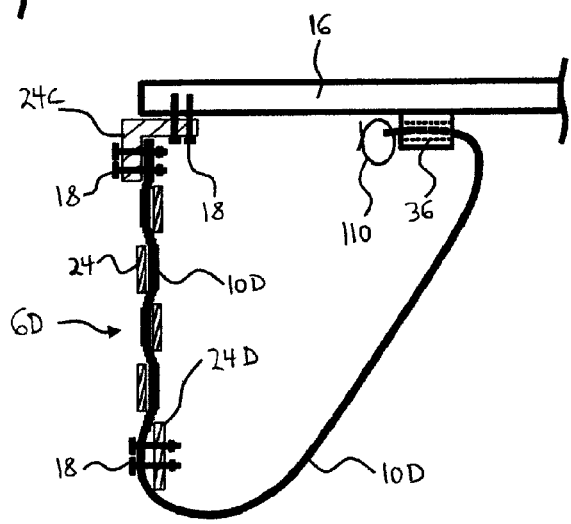
FIG. 28 is a section view of FIG. 1 panel assembly in mounting configuration 4.

FIG. 28 is a section view of the FIG. 1 panel assembly 6D in a fourth mounting configuration. This mounting configuration is similar to the FIG. 26 mounting configuration except that mounting slat 10D with holes not utilized by fasteners is received by slot or hole 36 in the chassis, shown as part of frame beam 16, and secured from by a pin or clip style lock 110 which prevents the mounting slat from releasing slat 10D while providing advantages such as improved mounting and removability of the assembly 6D.

As disclosed herein, a first plurality of slats are interwoven with the second plurality of slats to achieve the desired configuration of the panel. Each slat in the first and second set of slats may be interwoven between the other set of slats, such that both the front and rear faces of the interwoven slat engage front and rear faces of the other slats. In other applications, only the slats from one set may be interwoven with a parallel set of slats which are not interwoven. Also, it is preferable for an interwoven first slat to rest on the front face of one of the second slats, then on the back face of the adjacent second slat, and then on the front face of the next adjacent second slat, etc. In other applications, one slat may span more than one intersecting slat. For example, a horizontal slat could pass over two vertical slats, then under two vertical slats, then over two vertical slats, etc. Also, a plurality of slats in a set of slats may be interwoven with another set of slats, but all slats in that set may not be interwoven.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. An aerodynamic panel assembly for the underbody of a land vehicle, comprising:
    a first plurality of slats each having a longitudinal length greater than its width, a front face, and an opposing rear face;
    a second plurality of slats each having a longitudinal length greater than its width, a front face and opposing rear face, the first and second plurality of slats being interwoven such that both the front and rear faces of each of the first plurality of slats engage faces on the second plurality of slats, and the front and rear faces of each of the second plurality of slats engage faces on the first plurality of slats; and
    an attachment device including one or more of a mounting bracket, a hinge, and a fastener for attaching the first and second plurality of slats to the underbody of the vehicle.

2. An aerodynamic panel assembly as defined in claim 1, further comprising:
    one or more of the first plurality of slats and the second plurality of slats being a mounting slat extending from the panel for attaching the mounting slat to the vehicle.

3. An aerodynamic panel assembly as defined in claim 1, wherein each of the first plurality of slats has a substantially uniform width along its length with a reduced width adjacent a reduced width portion of one of a second plurality of slats.

4. An aerodynamic panel assembly as defined in claim 1, wherein each of the first plurality of slats has a substantially uniform thickness, with formed bends along an axial length of the first slat forming a recess in the first slat for receiving one of the second plurality of slats.

5. An aerodynamic panel assembly as defined in claim 1, wherein one or more of the first plurality of slats includes one or more longitudinally extending ribs for structural reinforcement.

6. An aerodynamic panel assembly as defined in claim 1, wherein one or more of the first plurality of slats includes one or more preformed bends in the slat each substantially perpendicular to the longitudinal length of the first slat, the bends being formed before assembly of the first plurality of slats and the second plurality of slats.

7. An aerodynamic panel assembly as defined in claim 1, wherein one or more of the first plurality of slats includes one or more air ducts for directing air flow through or past the panel assembly.

8. An aerodynamic panel assembly as defined in claim 1, wherein one or more of the first plurality of slats has a varying width.

9. An aerodynamic panel assembly as defined in claim 1, wherein one or more of the first plurality of slats and the second plurality of slats extends laterally from intersecting slats, and a lateral extension of the slat passes through an opening in the vehicle for attaching the panel assembly to the vehicle.

10. An aerodynamic panel assembly as defined in claim 1, further comprising:
one or more of the first plurality of slats and the second plurality of slats being a reinforcing slat having a bending stiffness greater than the other of the plurality of slats.

11. An aerodynamic panel assembly as defined in claim 10, wherein the reinforcing slat is positioned between opposing slat faces, and a stop member on the reinforcing slat limits travel of the reinforcing slat with respect to the opposing slat faces.

12. An aerodynamic panel assembly for the underbody of a land vehicle, comprising:
a first plurality of slats each having a longitudinal length greater than its width, a front face, and an opposing rear face;
a second plurality of slats each having a longitudinal length greater than its width, a front face and opposing rear face, the first and second plurality of slats being interwoven such that both the front and rear faces of each of the first plurality of slats engage faces on the second plurality of slats, and the front and rear faces of each of the second plurality of slats engage faces on the first plurality of slats, the width of each of the first and second plurality of slats being at least twice the thickness of the slat; and
one or more attachment mechanisms including one or more of a mounting bracket, a hinge, and a fastener for attaching the first and second plurality of slats to the underbody of the vehicle.

13. An aerodynamic panel assembly as defined in claim 12, further comprising:
one or more of the first plurality of slats and the second plurality of slats being a mounting slat extending from the panel for attaching the mounting slat to the vehicle.

14. An aerodynamic panel assembly as defined in claim 12, wherein each of the first plurality of slats has a substantially uniform thickness, with formed bends along an axial length of the first slat each substantially perpendicular to the axial length of the first slat forming a recess in the first slat for receiving one of the second plurality of slats.

15. A method of providing a panel assembly to the underbody of a land vehicle to reduce aerodynamic drag, comprising:
providing a first plurality of slats each having a longitudinal length greater than its width, a front face, and an opposing rear face;
providing a second plurality of slats each having a longitudinal length greater than its width, a front face and opposing rear face;
interweaving the first and second plurality of slats such that both the front and rear faces of each of the first plurality of slats engage faces on the second plurality of slats, and the front and rear faces of each of the second plurality of slats engage faces on the first plurality of slats; and
attaching the first and second plurality of slats to the underbody of the vehicle using one or more of a mounting bracket, a hinge, and a fastener.

16. A method as defined in claim 15, further comprising:
extending one or more of the first plurality of slats and the second plurality of slats from the panel to form a slat extension; and
attaching the slat extension to the vehicle.

17. A method as defined in claim 15, wherein one or more of the first plurality of slats and the second plurality of slats extends laterally from an intersecting slat, and a lateral extension of the slat passes through a slot secured to the vehicle for attaching the panel assembly to the vehicle.

18. A method as defined in claim 15, wherein each of the first plurality of slats has a substantially uniform thickness, with formed bends along a longitudinal length of the first slat each forming a recess in the first slat for receiving one of the second plurality of slats.

19. A method as defined in claim 15, further comprising:
one or more of the substantially horizontal slats and the substantially vertical is a reinforcing slat having a bending stiffness greater than the other of the plurality of slats.

* * * * *